United States Patent
Sudermann et al.

(10) Patent No.: US 10,279,424 B2
(45) Date of Patent: *May 7, 2019

(54) FILTER DEVICE FOR GAS FILTRATION AND FILTER ELEMENT FOR A FILTER DEVICE FOR GAS FILTRATION

(71) Applicant: MANN+HUMMEL GMBH, Ludwigsburg (DE)

(72) Inventors: Arthur Sudermann, Steinheim (DE); Marcel Hofmeister, Walheim (DE); Daniel Schmid, Sachsenheim (DE); Stefan Walz, Freiberg (DE); Matthias Krohlow, Herrenberg (DE); Thomas Sieber, Marklkofen (DE); Michael Kolmeder, Dingolfing (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 34 days.

This patent is subject to a terminal disclaimer.

(21) Appl. No.: 15/456,744

(22) Filed: Mar. 13, 2017

(65) Prior Publication Data
US 2017/0182588 A1  Jun. 29, 2017

Related U.S. Application Data

(63) Continuation of application No. PCT/EP2015/070790, filed on Sep. 11, 2015.

(30) Foreign Application Priority Data

Sep. 12, 2014 (DE) ........................ 10 2014 013 280

(51) Int. Cl.
*B01D 46/00* (2006.01)
*B23K 26/03* (2006.01)
(Continued)

(52) U.S. Cl.
CPC ........ *B23K 26/032* (2013.01); *B01D 46/0005* (2013.01); *B01D 46/0047* (2013.01);
(Continued)

(58) Field of Classification Search
CPC ........ B01D 46/10; B01D 46/00; B01D 46/52; B60H 3/06; F02M 35/024; F02M 35/02
(Continued)

(56) References Cited

U.S. PATENT DOCUMENTS 2,999,562 A   9/1961   Lechtenberg
4,640,698 A   2/1987   Ohishi et al.
(Continued)

FOREIGN PATENT DOCUMENTS

DE    19859854 A1    6/2000
DE    102004002293 A1   7/2005
(Continued)

*Primary Examiner* — Amber R Orlando
*Assistant Examiner* — Minh Chau T Pham
(74) *Attorney, Agent, or Firm* — James Hasselbeck (57) ABSTRACT

A filter device for gas filtration has a filter housing and a plate-type filter element disposed in the filter housing. The filter element is provided with a raw side and a clean side and is flowed through from the raw side to the clean side by a gas to be purified in a direction that is orthogonal to a filter plane of the plate-type filter element. A cover element is connected to the filter housing by a tensioning bolt penetrating the filter element. The filter element has a cutout forming a clean-side gas collecting chamber. A sealing element is arranged on the clean side of the filter element and frames the gas collecting chamber at least partially. A sealing eye is connected to the sealing element and arranged in the gas collecting chamber, wherein the tensioning bolt is guided through the sealing eye.

17 Claims, 7 Drawing Sheets

(51) Int. Cl.
*B01D 46/10* (2006.01)
*B01D 46/12* (2006.01)
*B01D 46/52* (2006.01)
*B23K 26/04* (2014.01)

(52) U.S. Cl.
CPC ............ *B01D 46/10* (2013.01); *B01D 46/12* (2013.01); *B01D 46/521* (2013.01); *B23K 26/048* (2013.01); *B01D 2271/022* (2013.01); *B01D 2275/206* (2013.01)

(58) Field of Classification Search
USPC ...... 55/498, 501, 502, 490, 495, 385.3, 529; 123/198 E
See application file for complete search history.

(56) References Cited

U.S. PATENT DOCUMENTS

| | | | |
|---|---|---|---|
| 5,391,212 A | 2/1995 | Ernst et al. | |
| 8,277,527 B2* | 10/2012 | Keller | F02B 27/00 123/198 E |
| 8,287,624 B2* | 10/2012 | Meisel | F24C 15/2035 95/1 |
| 8,409,312 B2* | 4/2013 | Gorg | B01D 46/0063 123/198 E |
| 9,895,640 B2* | 2/2018 | Sudermann | B01D 46/002 |
| 2008/0083200 A1* | 4/2008 | Gruber | B62J 37/00 55/385.3 |
| 2014/0260143 A1* | 9/2014 | Kaiser | B01D 46/10 55/501 |
| 2014/0318090 A1* | 10/2014 | Rieger | B01D 46/0001 55/502 |
| 2015/0013293 A1* | 1/2015 | Wagner | B01D 46/10 55/502 |
| 2015/0135665 A1* | 5/2015 | Bayerlein | B01D 46/0006 55/482 |
| 2016/0160816 A1* | 6/2016 | Venkatraman | F02M 35/0209 55/502 |

FOREIGN PATENT DOCUMENTS

| | | | | |
|---|---|---|---|---|
| DE | 102004005904 | * | 9/2005 | ............ B01D 46/10 |
| DE | 102013000111 A1 | | 7/2014 | |
| EP | 1144083 A1 | | 10/2001 | |

* cited by examiner

FILTER DEVICE FOR GAS FILTRATION AND FILTER ELEMENT FOR A FILTER DEVICE FOR GAS FILTRATION

CROSS-REFERENCE TO RELATED APPLICATIONS

This application is a continuation application of international application No. PCT/EP2015/070790 having an international filing date of 11 Sep. 2015 and designating the United States, the international application claiming a priority date of 12 Sep. 2014, based on prior filed German patent application No. 10 2014 013 280.3, the entire contents of the aforesaid international application and the aforesaid German patent application being incorporated herein by reference

BACKGROUND OF THE INVENTION

The invention concerns a filter device for gas filtration, in particular an air filter, comprising a plate-type filter element that is received in a filter housing and that can be flowed through orthogonally to its filter plane by the gas to be purified, and further comprising a cover element that is connected to the filter housing by a tensioning bolt penetrating the filter element. Moreover, the invention concerns a filter element for such a filter device.

EP 1 144 083 B1 discloses an air filter for an internal combustion engine which comprises, in a filter housing, a plate-type filter element which is flowed through orthogonally to the filter plane by the air to be purified. The inflow and outflow is realized by lateral sockets in the filter housing that are arranged, displaced axially relative to the filter element, on the raw side and the clean side, respectively. For fixation in the filter housing, the filter element comprises a central recess into which a support sleeve formed as one piece together with the filter housing is projecting. The support sleeve receives a tensioning bolt by means of which the housing cover can be screwed onto the filter housing. For a flow-tight closure, at the level of the raw side of the filter element, a sealing ring is placed on the end face of the support sleeve and, when the tensioning bolt is screwed in, is axially loaded by a projection on the inner side of the housing cover.

SUMMARY OF THE INVENTION

The invention has the object to configure with simple constructive measures a filter device for gas filtration exhibiting high efficiency.

This object is solved according to the invention by a filter device and a filter element for the filter device in that a cutout which forms a clean-side gas collecting chamber is introduced into the filter element and in that the tensioning bolt in the gas collecting chamber is guided through a sealing eye connected to a sealing element which is arranged on the clean side of the filter element and which frames the gas collecting chamber at least partially.

The filter device according to the invention or the filter element according to the invention is used for gas filtration, for example, as an air filter, by means of which combustion air to be supplied to the internal combustion engine of a vehicle is purified. Possible is also, for example, a use for filtration of breathing air which is supplied to the passenger compartment or a cabin.

The filter device comprises a flat plate-type filter element that is flowed through orthogonally to its filter plane by the gas to be purified; one side of the filter element forms accordingly the raw side where the gas to be purified flows in, the opposite side forms the clean side by means of which the purified gas flows out. The filter device is furthermore provided with a cover element that by means of a tensioning bolt can be fastened to the filter housing wherein the tensioning bolt is passed through a cutout in the filter element.

The cutout in the filter element forms a clean-side gas collecting chamber into which the gas after its filtration is guided from the clean side of the filter element. The gas collecting chamber serves for collecting the purified gas and for calming the flow for avoiding or reducing turbulences and swirls as well as for generating a laminar flow with which the purified gas is discharged from the collecting chamber. The discharge is realized preferably by an outflow socket which is provided on the filter housing and communicates with the gas collecting chamber.

On the clean side of the filter element, a sealing element is arranged which separates in the mounted state the clean side from the raw side in a flow-tight way. The tensioning bolt is passed through the gas collecting chamber and connects the cover element to the filter housing. In order to avoid that leakage flows between raw side and clean side occur in the area of the tensioning bolt, the tensioning bolt in the gas collecting chamber is passed through a sealing eye that is connected to the sealing element on the clean side of the filter element. The sealing element frames at least partially the gas collecting chamber which is introduced as a cutout into the filter element.

This embodiment has the advantage that a flow calming action occurs by means of the gas collecting chamber; also, due to the integration of the gas collecting chamber into the filter element, a compact embodiment results. The gas collecting chamber in this context is advantageously integrated into the filter element such that an envelope along the outer contour of the filter element also encloses the gas collecting chamber. The gas collecting chamber is advantageously open at the rim and is delimited at least at two sides by the filter element wherein the discharge of the purified gas is preferably realized by means of the open side of the gas collecting chamber. Also conceivable are gas collecting chambers that are enclosed at the rim and are integrated into the filter element and completely enclosed by the material of the filter element.

Since the tensioning bolt is passed through the gas collecting chamber, no additional installation space for the connection between the cover element and the filter housing is required. This also favors a compact embodiment. At the same time, by means of the sealing eye through which the tensioning bolt is guided a flow-tight separation between raw side and clean side is achieved so that the gas collecting chamber that receives the purified gas cannot generate an unwanted flow connection to the raw side in the area of the tensioning bolt. The sealing eye is connected to the sealing element and can be produced, as necessary, together with the sealing element in a common processing step. The sealing eye, as necessary, can be embodied as one piece together with the sealing element wherein in principle also a configuration as a separate component is conceivable which however is connected to the sealing element.

The sealing element extends advantageously along the outer contour of the filter element. The sealing eye is preferably located in immediate vicinity of the sealing element. The sealing eye, as necessary, can be connected with a sealing bracket that spans across the gas collecting chamber, in particular along the envelope or outer contour of the filter element, and that is connected to the sealing element, wherein a one-piece embodiment well as an embodiment as a separate component are conceivable. The sealing bracket which bridges the gas collecting chamber is resting in the mounted state on the outer wall surface of an outflow socket which communicates with the gas collecting chamber and through which the purified gas received in the gas collecting chamber of the filter device is discharged. The outflow socket in this context can be aligned with the filter element such that the longitudinal axis of the outflow socket is extending parallel to the filter plane and is preferably oriented toward the filter element.

According to a further expedient embodiment, the filter housing is provided with a support sleeve which projects into the gas collecting chamber and on which the sealing eye is supported. The support sleeve serves for connecting with the cover element or the tensioning bolt which can be screwed into the support sleeve. On the support sleeve, an annular shoulder can be formed on which the sealing eye is seated wherein the annular shoulder advantageously surrounds a receiving section which is arranged on the end face of the support sleeve and which serves for screwing in the tensioning bolt. The tensioning bolt is preferably guided through a connecting section on the bottom side of the cover element and projects with its thread into the receiving section on the support sleeve of the filter housing.

The cover element can be a housing cover of the filter housing. Possible is also an embodiment of the cover element for limiting the clean chamber at the clean side of the filter element wherein the cover element by means of the tensioning bolt is forced with a sufficiently high force onto the sealing element or the sealing eye on the clean side of the filter element in order to achieve a flow-tight closure.

For example, the filter element is embodied in a U-shape wherein the gas collecting chamber is arranged between the two lateral legs of the U-shape and a central section of the filter element connecting the legs and is delimited by these sections. Possible is also an H-shaped embodiment with two oppositely arranged gas collecting chambers which are delimited by lateral legs of the filter element and are separated by a central section of the filter element. In both embodiments, the gas collecting chamber is located inside the outer contour of the filter element wherein advantageously each gas collecting chamber has correlated therewith an outflow socket for discharging the purified gas.

The filter element comprises preferably a rectangular outer contour; the gas collecting chamber can also be embodied to be rectangular. Moreover, deviating geometries for the filter element as well as for the gas collecting chamber are however also possible, for example, a triangular gas collecting chamber.

According to a further expedient embodiment, the basic shape of the gas collecting chamber corresponds to a cutout of the filter element. The filter element is in particular cut out at the rim wherein the cutout forms the gas collecting chamber. For example, in case of a block-shaped filter medium body of the filter element where the filtration is taking place, an area that adjoins the rim can be cut out, for example, in rectangular shape, triangular shape, or semi-circular, and forms the gas collecting chamber. The gas collecting chamber therefore adjoins immediately the rim area of the cut filter medium body. The sealing bracket which spans across the gas collecting chamber can be designed of part-circular shape.

According to a further expedient embodiment, the filter element is comprised of at least two individual filters which, for example, are designed as filter bellows with a zigzag-folded filter medium. Each individual filter is embodied to be flat; adjoining individual filters are positioned parallel to each other. The individual filters can differ from each other with respect to their thickness, length and/or width or can also be embodied to be identical, as necessary. It can be expedient to position in a common plane the clean side of all individual filters which form the filter element.

The one or more filter bellows can have an orientation of the filter folds orthogonal to the rim side of the filter element where the gas collecting chamber that is open at the rim is located. However, an embodiment is also conceivable in which the filter folds of the filter bellows are parallel to the rim side of the filter element provided with the gas collecting chamber that is open at the rim. Moreover, it is possible, in case of a plurality of filter bellows that each form an individual filter, to provide either an identical orientation of the filter folds of all filter bellows or a different orientation of the filter folds.

According to a further expedient embodiment, on the filter element, in particular on the filter medium body of the filter element, a circumferentially extending plastic frame is arranged, for example, by injection molding. The plastic frame is connected fixedly with the filter medium body and can be a support of the circumferentially extending sealing element. The plastic frame is located on the rim side or exterior side of the filter medium body and follows thus the outer contour of the filter medium body.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
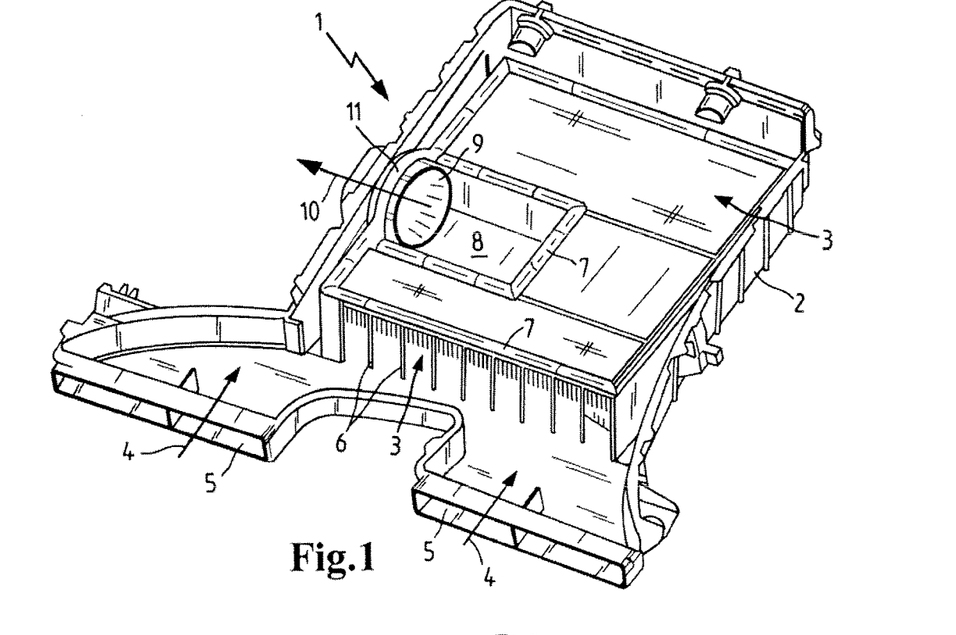
FIG. 1 shows a filter device embodied as an air filter, comprising a plate-type filter element in U-shape that delimits a clean-side gas collecting chamber by means of which the purified gas can be supplied to an outflow socket for discharging from the filter housing.

In FIG. 1, a filter device 1 for gas filtration is illustrated which is usable as an air filter for filtration of combustion air to be supplied to the internal combustion engine of a vehicle. The filter device 1 comprises, in a filter housing 2, a U-shaped filter element 3 which is embodied to be flat or plate-shaped, wherein in FIG. 1 the side of the filter element 3 at the bottom is the raw side and the side at the top is the clean side. The inflow is realized according to arrows 4 through inlets 5 of the filter housing 2 wherein the raw side of the filter element 3 is separated by support ribs 6 of the filter housing 2 from the inlets 5. The support ribs 6 have a supporting function for a circumferentially extending sealing element 7 on the top side or clean side of the filter element 3. The sealing element 7 extends along the U-shaped outer contour on the top side of the filter element 3. The support ribs 6 allow for inflow of the raw air to the raw side at the bottom of the filter element 3; as necessary, they can have also a flow-guiding function in addition to the support function.

In the U-shaped area of the filter element 3, a gas collecting chamber 8 for the gas to be purified is formed which is flowing from the clean side at the top of the filter element 3 into the gas collecting chamber 8. The gas collecting chamber 8 is positioned inside the rectangular outer contour or envelope of the filter element 3 and is delimited on three sides by the filter element 3. The gas collecting chamber 8 is open at the rim side; in the area of its open side there is a housing-associated outflow socket 9 by means of which the purified gas collected in the gas collecting chamber is discharged according to arrow 10 from the filter housing. The arrow 10 marks at the same time the longitudinal axis of the outflow socket 9. The outflow socket 9 comprises at its side which is facing the gas collecting chamber 8 a tulip-shaped or trumpet-shaped widened portion which ensures an improved discharge of the gas from the gas collecting chamber 8.

In addition to collecting the purified gas which is exiting at the top side of the filter element 3, the gas collecting chamber also has a flow-calming function. In this way, a laminar outflow of the purified gas according to arrow 10 through the outflow socket 9 is enhanced.

On the top side or clean side of the filter element 3, a sealing bracket 11 is formed as one piece together with the sealing element 7, extending along the outer contour on the filter element 3, and bridges the gas collecting chamber 8 and is resting on the wall surface of the outflow socket 9.

Figure 2:
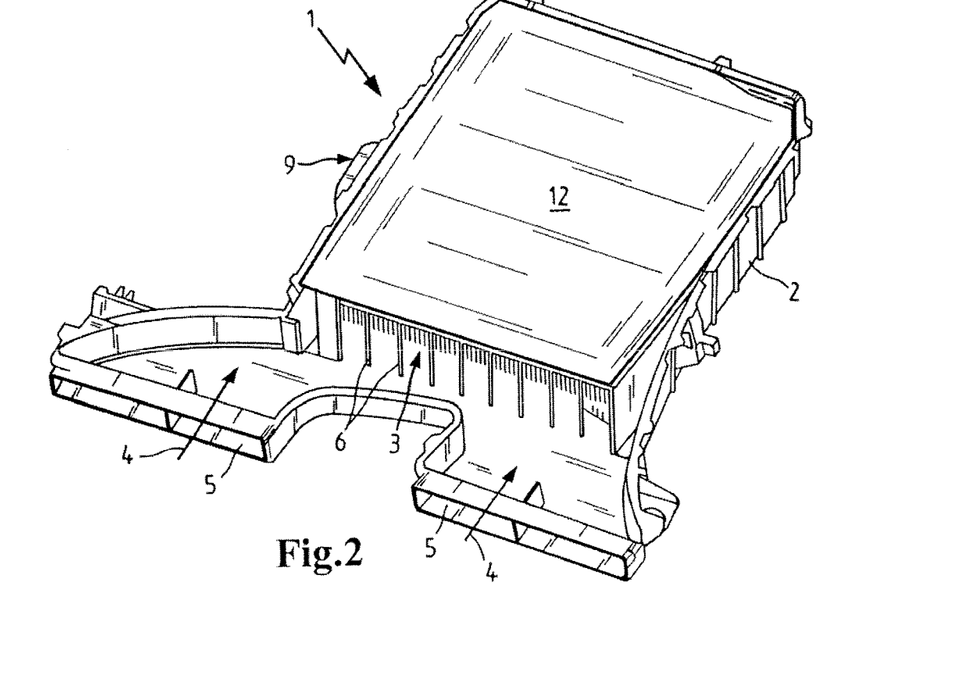
FIG. 2 shows the filter device according to FIG. 1 with attached cover element on the filter element.
Figure 3:
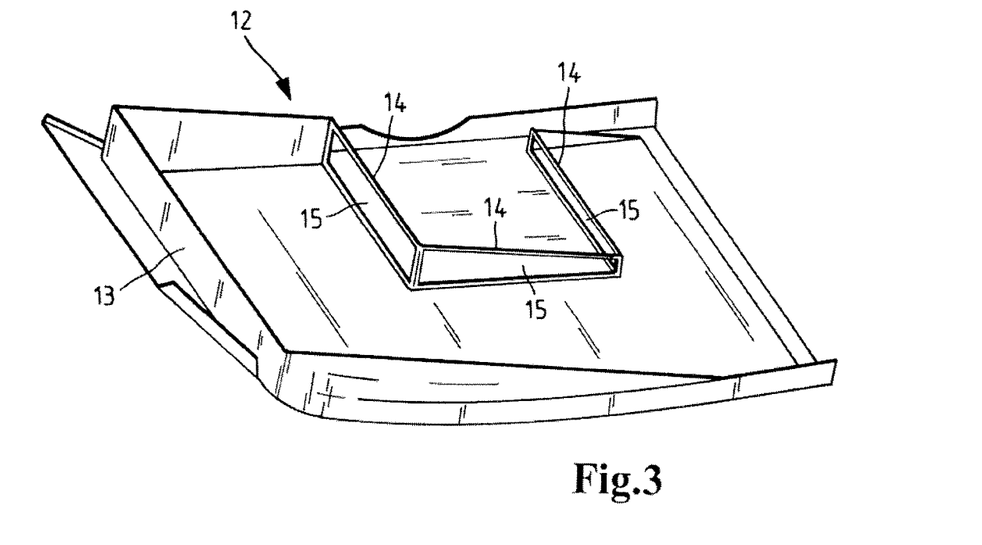
FIG. 3 shows the cover element in a view from below.

In FIG. 2, the filter device 1 is illustrated with a plastic cover element 12 which is placed onto the filter element 3. In FIG. 3, the cover element 12 is illustrated in a view from below from which it can be taken that on the cover element 12 a circumferential sealing frame 13 is integrally formed which, in mounted position, is resting on the circumferentially extending sealing element 7 (FIG. 1) and delimits a clean space on the clean side at the top of the filter element 3 in outward direction. On the inner side of the cover element 12, as can be seen moreover in FIG. 3, there is also a support frame 14 integrally formed which corresponds to the rectangular contour of the gas collecting chamber 8 and is provided with openings 15 by means of which the purified gas can flow from the clean side of the filter element inwardly in the direction of the gas collecting chamber 8.

Figure 4:
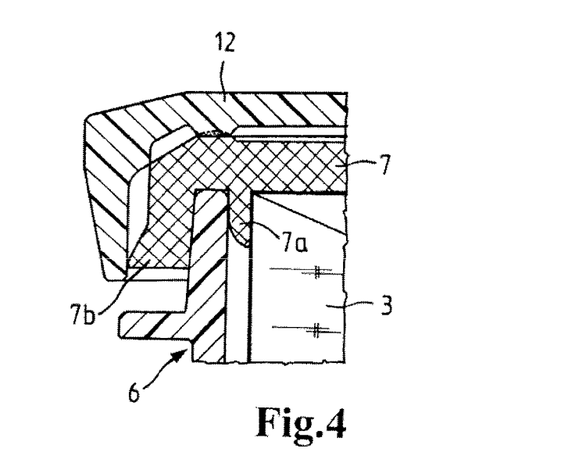
FIG. 4 shows a section through the rim area of the filter element.

FIG. 4 shows a section illustration through the rim area of the filter element 3 with circumferentially extending sealing element 7 that acts to seal in radial direction and is supported on the filter housing 2, comprised of plastic material, by the support ribs 6 or a transverse beam supported by the support ribs 6. Between the support ribs 6 or the transverse beam and the filter element 3 there is a sealing lip 7a. On the exterior side of the support ribs 6 or the transverse beam, a further folded-over sealing lip 7b is provided. The sealing lip 7b as well as the top sections of the sealing element 7 are engaged across by the cover element 12.

Figure 5:
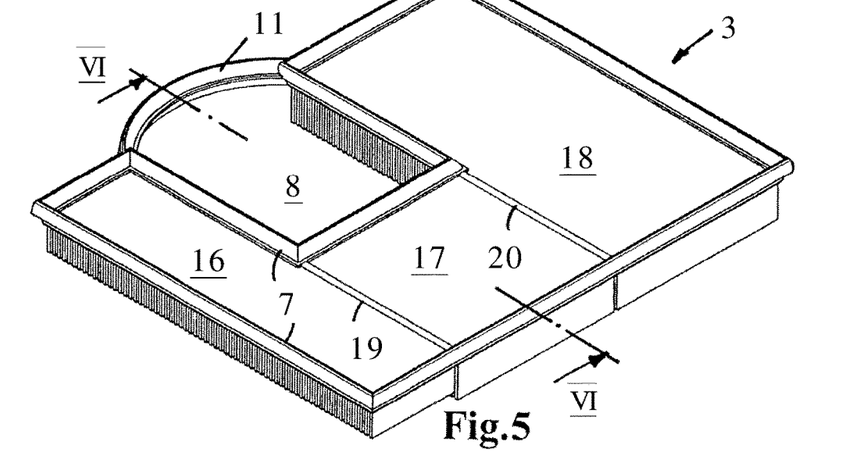
FIG. 5 shows the filter element in perspective illustration.
Figure 6:
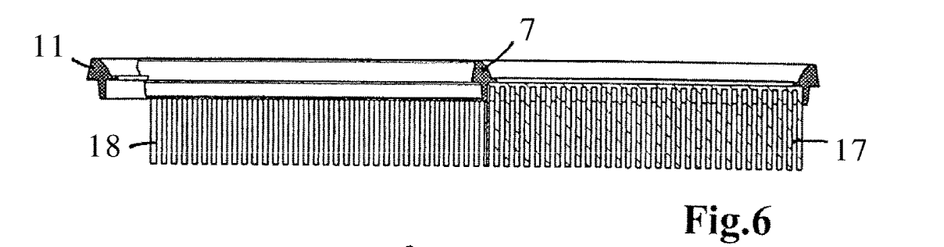
FIG. 6 shows a section according to section line VI-VI of FIG. 5 through the filter element.

In FIGS. 5 and 6, the filter element 3 is shown in individual illustration. The U-shaped filter element 3 is comprised of three individual separately embodied individual filters that are embodied as filter bellows 16, 17, 18 which each comprise a folded filter medium and are formed flat or plate-shaped. The clean side at the top of all filter bellows 16, 17, and 18 is positioned in a common plane while the raw side at the bottom, due to different heights of the filter bellows, is positioned at different levels. The two outwardly positioned filter bellows 16 and 18 form the legs of the U-shaped filter body; the central intermediately positioned filter bellows 17 connects the two outwardly positioned filter bellows 16 and 18. The filter bellows 16, 17, and 18 delimit the rectangular gas collecting chamber 8 on three different sides. Also, the filter element 3 as a whole has a rectangular shape wherein the gas collecting chamber 8 is located within the envelope or outer contour of the rectangular shape of the filter element 3 and is open at the rim. The first outwardly positioned filter bellows 16 has a reduced height in comparison to the two further filter bellows 17 and 18 that have the same height. The length of the gas collecting chamber 8, viewed along the longitudinal extension of the lateral legs formed by the filter bellows 16 and 18, corresponds approximately to half of the total length of the filter element 3.

At its open side, the gas collecting chamber 8 in the area of the outer contour of the filter element 3 is spanned by a sealing bracket 11 which in the mounted state (FIG. 7) is resting on the outer wall surface of the outflow socket 9. In the embodiment according to FIGS. 5 to 7, the sealing bracket 11 is formed as one piece together with the sealing element 7 on the clean side of the filter element 3. The sealing element 7 and the sealing bracket 11 are cast onto the filter element 3.

Figure 7:
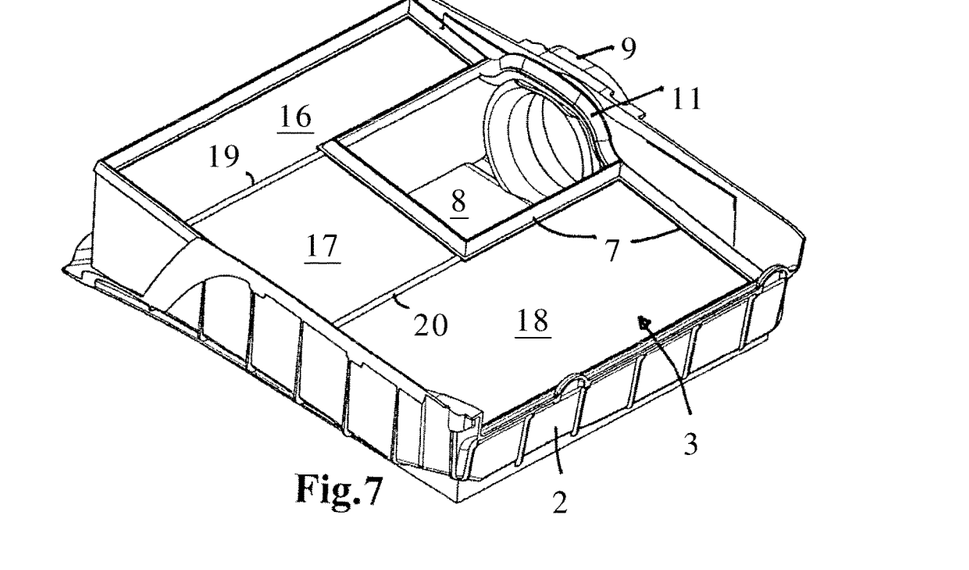
FIG. 7 shows in perspective illustration the filter element inserted into the filter housing.

The sealing bracket 11 in the undeformed state (FIGS. 5, 6) is positioned in the same plane as the circumferentially extending sealing element 7 and is convexly curved in outward direction so that the actual length of the sealing bracket 11 is greater than the width of the gas collecting chamber 8 to be bridged. This makes it possible, as illustrated in FIG. 7, to fold the sealing bracket 11 in upward direction by 90° and to deform it three-dimensionally so that the sealing bracket 11 comes to lie against the outer wall of the outflow socket 9 in the filter housing 2.

Two adjoining filter bellows 16, 17, 18 are joined together by a sealing strip 19 or 20. For the rest, the filter bellows 16, 17, 18 are resting immediately against each other. Also, the circumferentially extending sealing element 7 holds the filter bellows 16 to 18 together.

The extension in transverse direction, i.e., transverse to the longitudinal extension along the outwardly positioned filter bellows 16 and 18 that form the lateral legs of the U-shaped filter body, can be of different size for the filter bellows. In the embodiment, the first outwardly positioned filter bellows 16 has a smaller transverse extension than the two further filter bellows 17 and 18 which are approximately of the same size in transverse direction.

Figure 8:
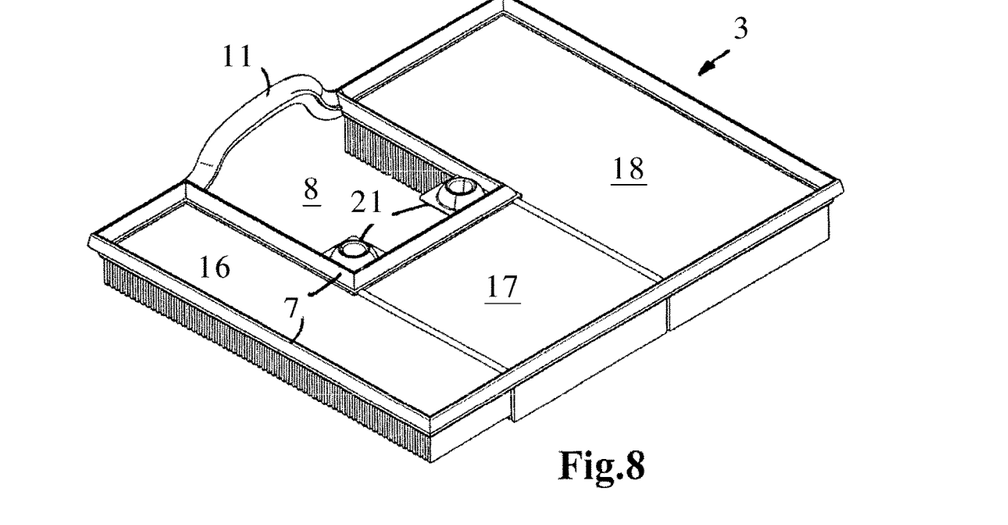
FIG. 8 shows the filter element in an embodiment variant with sealing eyes in the gas collecting chamber, wherein the sealing eyes are connected to a circumferentially extending sealing element on the filter element.
Figure 9:
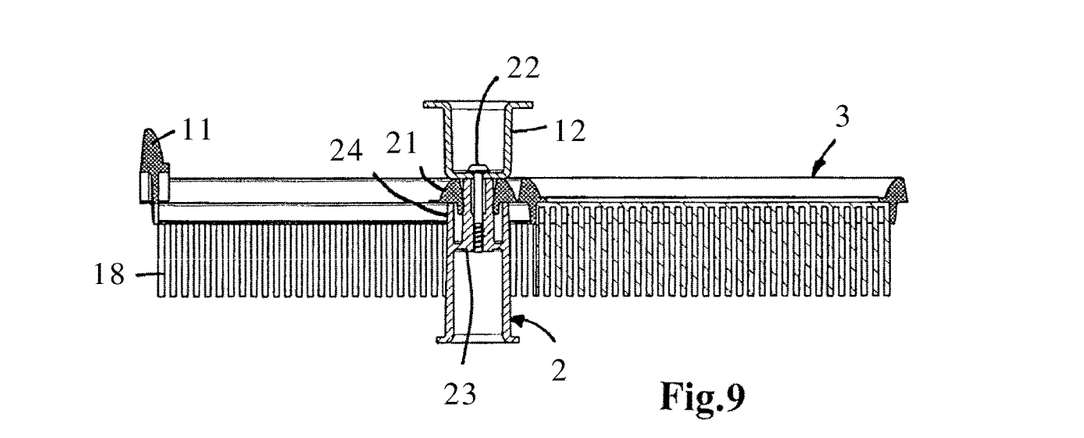
FIG. 9 shows a section through the filter element in the area of a sealing eye through which a tensioning bolt for connecting the filter housing to the cover element is extending.

In FIGS. 8 and 9, an embodiment variant is illustrated in which the filter element 3 is in principle of the same construction as in FIG. 5. In addition, sealing eyes 21 are however integrally formed on the circumferentially extending sealing element 7 and serve for receiving a tensioning bolt by means of which, in the area of the sealing eyes 21, the cover element 12 is to be connected to the filter housing 2 by screwing. The sealing eyes 21 are located in the gas collecting chamber 8 on the side which is facing the central filter bellows 17 and are preferably embodied as one piece together with the sealing element 7. The tensioning bolt 22 is inserted from above into a depression in the cover element 12 and screwed into a support sleeve 23 of the filter housing 2 which is projecting upwardly from the filter housing 2 arranged at the bottom and which is located in the corner area of the gas collecting chamber 8. The sealing eye 21 engages around the support sleeve 23 and is supported on an annular shoulder 24 of the support sleeve 23. The top end face of the sealing eye 21 is loaded axially by the depression in the cover element 12 on which also the head of the tensioning bolt 22 is resting. By screwing the tensioning bolt 22 into the support sleeve 23, a pressure is axially applied onto the sealing eye 21 so that the clean chamber at the top is separated flow-tightly from the raw side positioned at the bottom.

Figure 10:
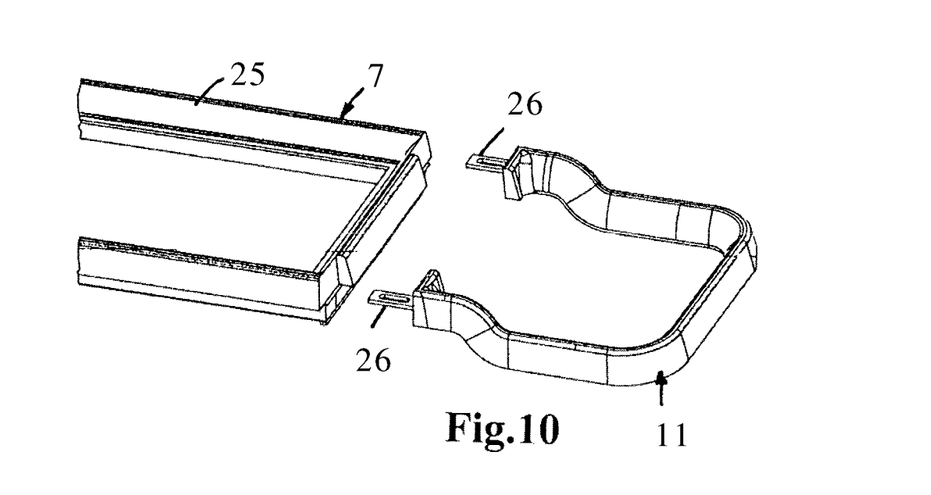
FIG. 10 shows an embodiment variant with a sealing bracket on a frame which can be placed onto a filter bellows, wherein the sealing bracket comprises a separate plastic component part to which a sealing foam is to be connected by injection molding.
Figure 11:
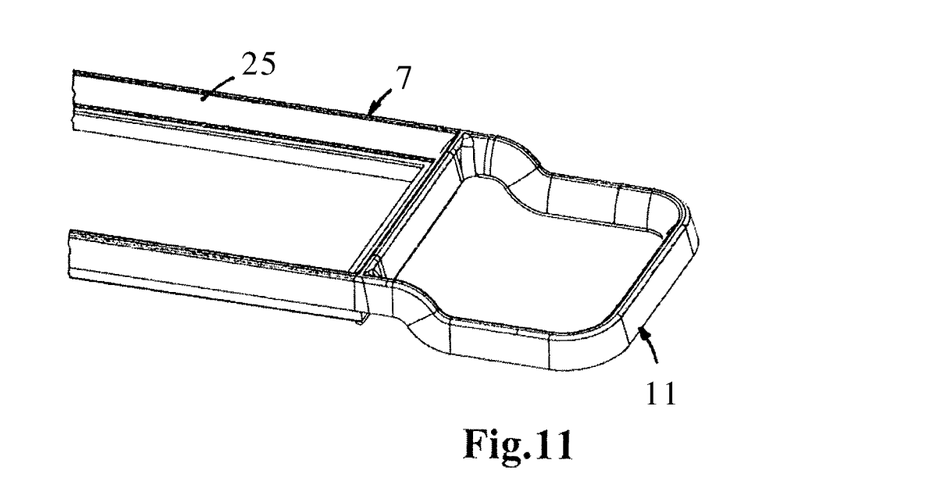
FIG. 11 shows the embodiment variant of FIG. 10 with the sealing bracket attached to the frame.

In FIGS. 10 and 11, an embodiment variant for producing a circumferentially extending sealing element 7 is illustrated. In contrast to the preceding embodiments, the sealing element 7 is not cast onto the filter element but, in accordance with FIGS. 10 and 11, a support 25 of plastic material that forms a frame is connected with the filter element or the filter bellows, in particular adhesively. The frame 25 can subsequently be provided with a sealing material, for example, with a metered-on PUR foam.

The sealing bracket 11 which is resting on the outflow socket is embodied as a separate component and is comprised in analogy to the sealing element 7 of a support of plastic material that is U-shaped and comprises at both its end faces a connecting tab 26, respectively, for connection with the frame 25. After connecting the sealing bracket 11 to the frame 25 (FIG. 11), the frame 25 and the plastic support of the sealing bracket 11 can be provided with sealing material in a common step.

The sealing bracket 11 comprises a three-dimensionally deformed shape and is in particular matched to the outer contour of the outflow socket.

Figure 12:
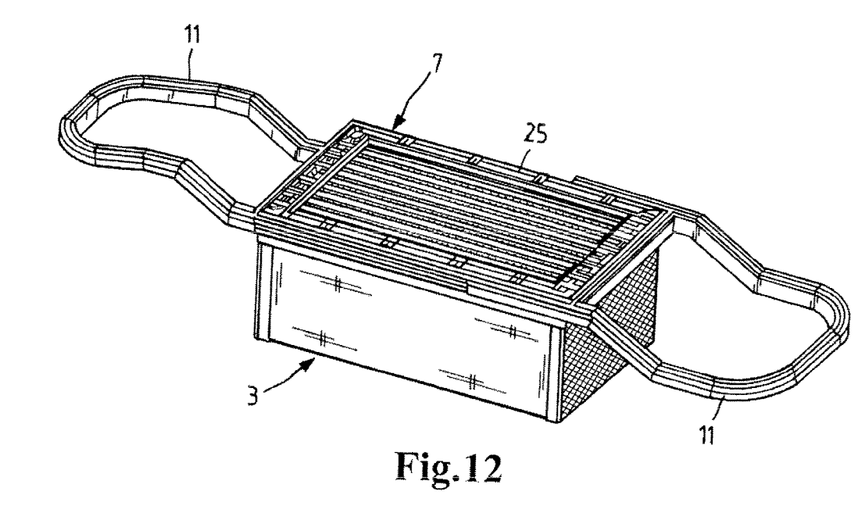
FIG. 12 shows an embodiment variant with two sealing brackets on opposed sides of a filter bellows, wherein the sealing brackets are formed as one piece together with a frame element on the filter bellows and are provided with sealing material.

In the embodiment according to FIG. 12, the sealing bracket 11 is formed as one piece together with the sealing element 7. As in the embodiment according to FIGS. 10 and 11, the sealing element 7 is comprised of a frame 25 of plastic material which is connected with the filter element 3, for example, adhesively. The plastic support of the sealing bracket 11 is embodied as one piece together with the frame 25 and is three-dimensionally deformed and, according to the left half of FIG. 12, is angled relative to the plane of the frame 25 in upward direction and, according to the right half of FIG. 12, is angled in downward direction. The frame 25 and the plastic support of the sealing bracket 11 are provided in a common step with sealing material that can be applied, for example, by injection molding.

Figure 13:
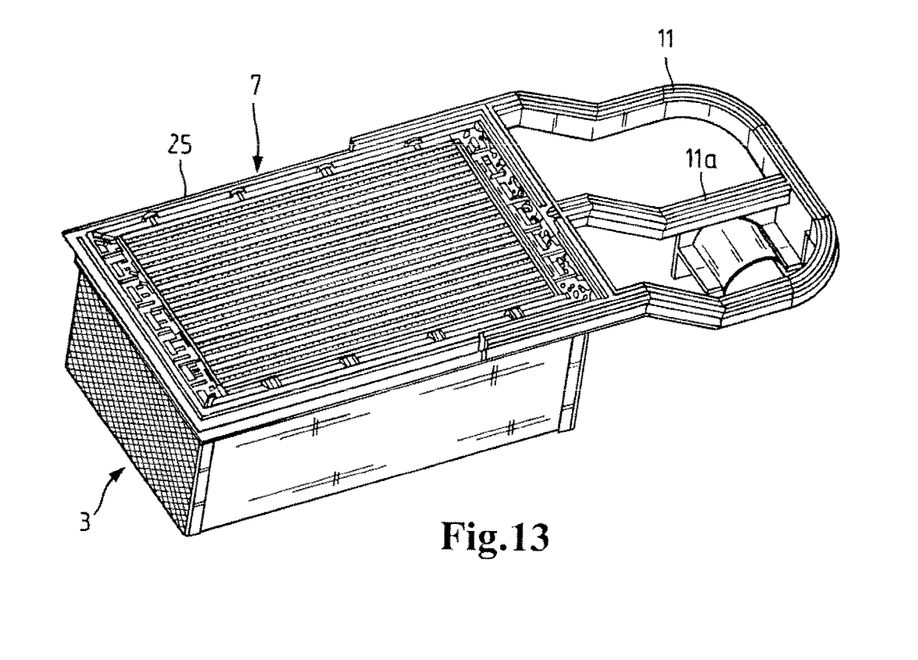
FIG. 13 shows an embodiment similar to FIG. 12 but with a deviating geometry of the sealing bracket.

In the embodiment according to FIG. 13, as in FIG. 11, the sealing element 7 is provided with a frame 25 and the plastic support of the sealing bracket 11 is formed together with it as one piece. Frame 25 and plastic support of the sealing bracket 11 together can be provided with sealing material. In the sealing bracket 11, in contrast to FIG. 12, an additional stay 11a can be integrally formed which is centrally extending between the U-shaped sealing bracket 11 and improves the stability. The additional stay 11a may also support further functional plastic parts. The stay 11a can also be provided with sealing material.

Figure 14:
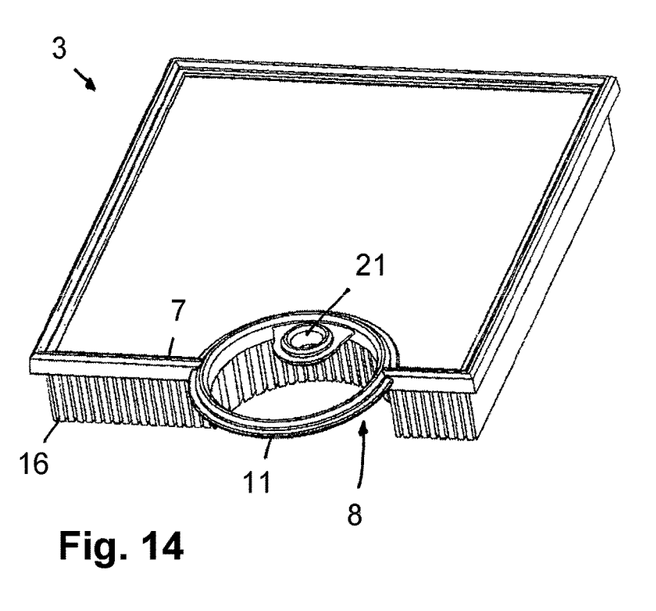
FIG. 14 shows a filter element in an embodiment variant with a part-circular gas collecting chamber in the rim area of the filter element with an annular sealing element at the gas collecting chamber on which a sealing eye is integrally formed.

In FIG. 14, a further embodiment of a filter element 3 with a filter bellows 16 embodied as a folded filter is illustrated. The filter bellows 16 is cut out at the rim area wherein the cutout forms the gas collecting chamber 8 which has a part-circular basic shape in FIG. 14.

On the outer contour of the filter bellows 16, the sealing element 7 is extending circumferentially and also follows the contour in the area of the cutout that forms the gas collecting chamber 8. In the area of the gas collecting chamber 8, the sealing element 3 has an annular shape wherein the ring area projecting past the rim side of the filter element forms the sealing bracket 11 which, in the installed state of the filter element, is resting on the wall surface of the outflow socket. As necessary, on the filter bellows 16 a plastic frame is applied by injection molding which is the support of the sealing element 7 and can also be a component of the sealing bracket 11.

In the inwardly positioned area of the annular sealing element, a sealing eye 21 is integrally formed which, in accordance with the embodiment of FIGS. 8 and 9, serves for receiving a tensioning bolt by means of which, in the area of the sealing eye, a cover element is to be connected to the filter housing by screwing.

What is claimed is:
1. A filter device for gas filtration, comprising:
a filter housing having an outflow socket;
a flat filter element disposed in the filter housing and comprising
at least one filter bellows having a raw side and a clean side;
wherein the flat filter element is configured to be flowed through from the raw side to the clean side by a gas to be purified in a direction that is orthogonal to a filter plane of the flat filter element;
a cover element connected to the filter housing by a tensioning bolt penetrating the filter element;
the filter element comprising:
a cutout region arranged within the filter bellows and extending through the filter bellows from the raw side to the clean side, forming a clean-side gas collection chamber in the filter bellows, the gas collection chamber arranged within an outer lateral contour of the filter element;
wherein at least two sides of the gas collecting chamber are delimited by the at least one filter bellows of the filter element;
wherein the gas collection chamber opens laterally through the outer lateral contour;
wherein the outflow socket is arranged at the lateral opening of the gas collection chamber;

the filter element further comprising a sealing element arranged on the clean side of the filter element and framing the gas collecting chamber at least partially;

the filter element further comprising a sealing eye connected to the sealing element and arranged in the gas collecting chamber, wherein the tensioning bolt is guided through the sealing eye.

2. The filter device according to claim 1, wherein the sealing element extends along an outer contour of the filter element.

3. The filter device according to claim 1, further comprising a sealing bracket connected to the sealing element on the clean side of the filter element and spanning the gas collecting chamber, wherein the sealing eye is connected to the sealing bracket.

4. The filter device according to claim 3, wherein the sealing bracket is part-circular and is arranged to contact against an outer side of the outflow socket.

5. The filter device according to claim 1, wherein the filter housing comprises a support sleeve projecting into the gas collecting chamber, wherein the sealing eye is supported on the support sleeve.

6. The filter device according to claim 5, wherein the support sleeve comprises an annular shoulder and the sealing eye is seated on the annular shoulder.

7. The filter device according to claim 5, wherein the tensioning bolt is screwed into the support sleeve.

8. The filter device according to claim 5, wherein the support sleeve comprises an end face receiving section and the tensioning bolt is screwed into the end face receiving section, wherein the annular shoulder engages around the end face receiving section of the support sleeve.

9. The filter device according to claim 1, wherein the filter element is U-shaped and comprises two lateral legs, wherein the gas collecting chamber is arranged between the two lateral legs of the filter element.

10. The filter device according to claim 1, wherein the gas collecting chamber is open at a rim side of the filter element.

11. The filter device according to claim 1, wherein the gas collecting chamber has a basic shape selected from the group consisting of a round shape, an oval shape, a rectangular shape, and a triangular shape.

12. The filter device according to claim 1, wherein the at least one filter bellows of the filter element comprises a plurality of filter folds.

13. The filter device according to claim 12, wherein the gas collecting chamber is open at a rim side of the filter element, wherein the filter folds of at least one of the filter bellows extend orthogonally to said rim side of the filter element where the gas collecting chamber is open.

14. The filter device according to claim 12, wherein the gas collecting chamber is open at a rim side of the filter element, wherein the filter folds of at least one of the filter bellows extend parallel to said rim side of the filter element where the gas collecting chamber is open.

15. The filter device according to claim 1, wherein the filter element further comprising a plastic frame extending about a circumference of the filter element.

16. The filter device according to claim 15, wherein the plastic frame is fixedly connected the circumference of the filter element;

wherein the plastic frame is fixedly connected by injection molding onto the filter element.

17. A filter element for a filter device according to claim 1, the filter element comprising:

a flat filter element comprising at least one filter bellows having a raw side and a clean side and configured to be flowed through from the raw side to the clean side by a gas to be purified in a direction that is orthogonal to a filter plane of the flat filter element;

wherein the filter element comprises a cutout region arranged within the filter bellows and forming a clean-side gas collection chamber in the filter bellows extending through the filter bellows from the raw side to the clean side, the gas collection chamber arranged within an outer lateral contour of the filter element;

wherein at least two sides of the gas collecting chamber are delimited by the at least one filter bellows of the filter element;

wherein the gas collection chamber opens laterally through the outer lateral contour;

a sealing element arranged on the clean side of the filter element and framing the gas collecting chamber at least partially;

a sealing eye connected to the sealing element and arranged in the gas collecting chamber.

* * * * *